United States Patent [19]

Smith

[11] Patent Number: 4,580,771

[45] Date of Patent: Apr. 8, 1986

[54] SHEET TRANSFER APPARATUS

[76] Inventor: W. Vernon Smith, 14356 Brenan Way, Tustin, Calif. 92680

[21] Appl. No.: 649,966

[22] Filed: Sep. 12, 1984

Related U.S. Application Data

[63] Continuation of Ser. No. 383,896, Jun. 1, 1982, abandoned.

[51] Int. Cl.⁴ .................. B65H 29/24; B65H 3/14
[52] U.S. Cl. .................................. 271/97; 271/160; 271/105; 83/281; 355/3 SH
[58] Field of Search .................. 271/19, 20, 21, 22, 271/24, 97, 98, 105, 160, 267, 268, 269, 264, 184; 83/374, 402, 281, 451; 355/14 SH, 3 SH

[56] References Cited

U.S. PATENT DOCUMENTS

| | | | |
|---|---|---|---|
| 1,196,361 | 8/1916 | Howell et al. | 271/22 |
| 1,447,388 | 3/1923 | Kalmanovitch | 271/22 X |
| 3,119,295 | 1/1964 | Dreyer | 83/417 |
| 3,131,594 | 5/1964 | Benson | 88/24 |
| 3,136,539 | 6/1964 | Lyman | 271/26 |
| 3,219,340 | 11/1965 | Hori et al. | 271/11 |
| 3,345,922 | 10/1967 | Williams et al. | 93/54 |
| 3,411,829 | 11/1968 | Albright | 302/29 |
| 3,504,910 | 4/1970 | Spyropoulos | 271/18 |
| 3,511,495 | 5/1970 | Schonfeld | 271/26 |
| 3,547,431 | 12/1970 | Wagner | 271/11 |
| 3,550,964 | 12/1970 | Spyropoulos | 302/2 |
| 3,610,577 | 10/1971 | Foster, Jr. | 271/30 |
| 3,614,168 | 10/1971 | Range | 302/31 |
| 3,645,526 | 2/1972 | Holecek et al. | 271/32 |
| 3,770,266 | 11/1973 | Wehr et al. | 271/97 |
| 3,806,114 | 4/1974 | Carter | 271/20 |
| 3,822,024 | 7/1974 | Endter et al. | 214/8.5 D |
| 3,997,153 | 12/1976 | Britt et al. | 271/93 |
| 4,049,255 | 9/1977 | Stange et al. | 271/3 |
| 4,062,538 | 12/1977 | Stange et al. | 271/243 |
| 4,065,118 | 12/1977 | Dudley | 271/14 |
| 4,066,254 | 1/1978 | Stange et al. | 271/195 |
| 4,078,788 | 3/1978 | Bellis et al. | 271/160 X |
| 4,175,857 | 11/1979 | Rapp et al. | 355/73 |
| 4,184,672 | 1/1980 | Watkins et al. | 271/105 |
| 4,270,746 | 6/1981 | Hamlin | 271/98 |
| 4,275,877 | 6/1981 | Silverberg | 271/166 |
| 4,305,576 | 12/1981 | Hamlin | 271/11 |

FOREIGN PATENT DOCUMENTS

| | | |
|---|---|---|
| 8273775 | 1/1977 | Australia. |
| 2315589 | 10/1974 | Fed. Rep. of Germany ........ 271/22 |
| 2329927 | 1/1975 | Fed. Rep. of Germany. |
| 2338213 | 8/1977 | France. |

OTHER PUBLICATIONS

Research Disclosure, Nov. 1981, "Document Feeder with Improved Vacuum System"—Disclosed by Richard S. Muka.

Primary Examiner—Bruce H. Stoner, Jr.
Assistant Examiner—James E. Barlow
Attorney, Agent, or Firm—McCormick, Paulding & Huber

[57] ABSTRACT

An automatic sheet feeding mechanism adapted to separate a single sheet from a stack of sheets and transfer the single sheet via airjets to the exposure platen of an exposing apparatus. After airjet positioning and exposure, the single sheet is lifted from the platen and delivered to an exit port also via airjets.

7 Claims, 1 Drawing Figure

SHEET TRANSFER APPARATUS

This is a continuation of application Ser. No. 383,896, filed June 1, 1982 now abandoned.

BACKGROUND OF THE INVENTION

This invention relates to a novel method and apparatus for separating and serially delivering single sheets from a stack of sheets. More particularly, the invention pertains to an apparatus and process for aerodynamically separating and transferring such sheets individually to a work station. The individual sheet may then be accurately positioned at the work station for subsequent operations.

It has been known in the art that sheets may be aerodynamically separated and moved by means of airjets through a predetermined guide path. A cushion of air at different pressures on either side of the sheet provide the requisite lift and drag to bias the sheets to travel in a desired direction. The present invention provides a novel apparatus and improved method for individually separating the worksheet and controlling sheet delivery. The invention accomplishes this by first moving the top sheet of a stack of sheets in a direction opposite to the desired travel direction until a stop guide is reached, and then reversing the direction to the desired travel direction.

In a further embodiment of the invention, the single sheet is delivered to a work station for further manipulation. Such may include exposure as in a copying machine or exposure by means of a beam such as a laser or other light beam or an electron, or other particle beam. The system is particularly suitable for exposure of sheets having a photosensitive material on their surface. In a typical operation, the sheet is delivered from the dispenser to an exposure platen and accurately positioned on the platen by means of iterative or trial and error airjet bursts until a desired position is attained. The platen then moves under the exposure means. After exposure, airjets lift the sheet from the platen and it exits the apparatus. Additional operations such as hole punching, etc. may also be performed on the sheet.

SUMMARY OF THE INVENTION

The invention provides a sheet dispenser which comprises a generally rectangular sheet reservoir having front, rear and side walls defining a reservoir perimeter; an elevatable floor adapted to traverse up and down within said perimeter; a lip on said front wall protruding over a portion of the interior of said reservoir; a generally rectangular airjet plate supported above, spaced from, and in a plane generally parallel to the plane of the top of said reservoir, said plate having a sheet stop catch at the rear portion thereof and having at least one rearward and at least one forward directed airjet port open to the underside of said plate; said lip and the front portion of said plate forming an exit path for said sheet.

The invention also encompasses such a dispenser further comprising a sheet exposure platen capable of receiving a sheet from said exit path, having a generally rectangular support and having a plurality of airholes therethrough; an exposure beam capable of scanning the top of said platen from a direction perpendicular to the plane of said platen; platen moving means capable of causing said platen to traverse a predetermined path perpendicular to said beam path; means for providing both a vacuum and a positive air displacement through said airholes; and an airjet support shelf positioned above and in a plane generally parallel to the plane of said platen and having a plurality of airjets open to the underside of said shelf capable of moving a sheet in orthogonal directions on said platen to a predetermined position on said platen and being capable of delivering said sheet through an exit passageway.

The dispenser may optionally further comprise sheet punching and position sensing means as well as means for sequentially selectively applying and removing air pressure through the airjets and airholes for sheet manipulation.

DETAILED DESCRIPTION OF THE PREFERRED EMBODIMENT

Figure 1:
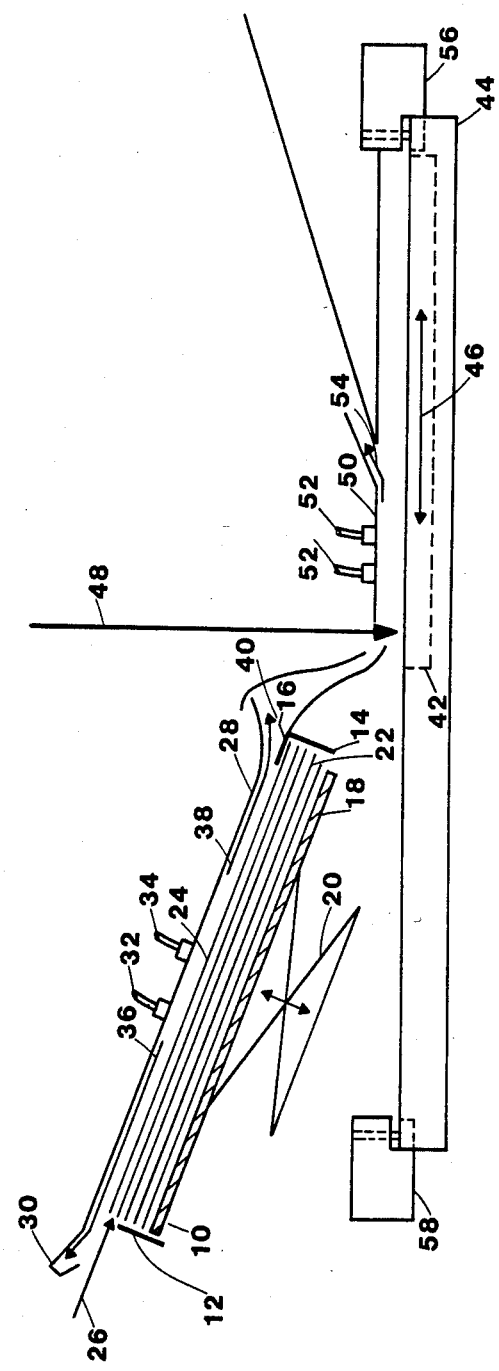
FIG. 1 is a partial sectional, schematic side view of the sheet dispenser apparatus of the present invention.

As hereinbefore mentioned, the invention provides a dispenser for sheet-like materials such as paper, cards, computer cards, plastic films, photosensitive films, lithographic printing plates or the like. The invention comprises a sheet reservoir 10 which is generally rectangular and has a plurality of sidewalls which define its perimeter. Such walls include rear wall 12, front wall 14 and side walls which are not shown. Front wall 14 has a lip 16 which partially protrudes and overhangs over the interior portion of the reservoir. The reservoir has a movable floor 18 which is operated by appropriate means 20 to cause the floor and any sheets 22 on the floor to traverse as directed up and down within the center of the reservoir compartment. In operation it is desired to keep the uppermost sheet 24 in as high a raised position in the compartment as possible without being pressed up against lip 16. Means, not shown may be provided to detect the actual position of the uppermost sheet as well as the approximate number of sheets remaining in the reservoir. Means may be provided, such as airjet means to briefly ripple the stack of sheets from the general direction of arrow 26. In the preferred embodiment this airjet may be slightly downwardly directed into the sheet stack. This causes the upper few sheets to have some air entrained between them and become somewhat, if not completely separated from one another.

Above the reservoir is a generally rectangular airjet plate 28 which has a generally C-shaped sheet stop catch 30 at the rear portion thereof. Attached to the plate are rearward directed airjet 32 and forward directed airjet 34. In operation, after the sheets are rippled and separated by airjet means from the direction of arrow 26, airjet 32 is activated to cause a flow of high velocity, low static pressure air on top of the uppermost sheet. A pressure differential is thereby created whereby air at a lower velocity but higher static pressure exists under the first sheet. This causes the uppermost sheet to lift as an airfoil. The air friction caused by the airjet then causes the top sheet to move rearwardly in the direction of arrow 36 until the back portion of the top sheet hits stop catch 30 and the front of the sheet is freed of lip 16. The lower level sheets, since they are not in contact with airstream 36 are not lifted or moved rearward and hence will not be freed of the stopping action of lip 16.

After the uppermost sheet is in the stop catch position, rearward airjet 32 is cut off and forward airjet 34 is activated. The same sheet lift action is noticed but now a forward motion, in the directon of arrow 38 is achieved. The sheet is then passed by such motion through exit path 40 formed by lip 16 and the front of plate 28. Any lift provided to lower the level sheets by airjet 34 is also stopped by lip 16.

Exit path 40 effectively dovetails with an exposure mechanism whereby photosensitive sheets may be delivered to exposure means. Such exposure means may comprise an exposure platen 42 capable of horizontal displacement along a defined path, such as with frame 44. Platen 42 has a plurality of airholes therethrough capable of holding a delivered sheet firmly to its surface via applied vacuum means, not shown. Typically the platen is driven by suitable means to cause it to move in the directions of arrow 46. A photosensitive sheet may be acted upon by exposure beam 48 as the platen traverses under the beam. The exposure beam may be a laser, a regulated light source of one or more wavelengths, an electron beam, an ionized particle beam or the like.

Above the platen is an airjet support shelf 50 which bears a plurality of airjets, 52 similar to jets 32 and 34. These jets have regulated air flow and are directed such that they may be selectively activated to accurately provide sufficient lift and directional motion to a sheet to accurately position the sheet on the platen surface by an iterative, trial and error, or other control mechanism. Naturally suitable position sensors may cooperate with the sheet and platen. In the preferred embodiment, the airjets on the shelf are orthogonally directed to provide the necessary sheet positioning. As an option, the dispenser may be provided with other functional attachments for sheet preparation such as punches 56 and 58.

In operation, a sheet is delivered from exit path 40 to platen 46. It is accurately positioned on the platen via airjets 52, etc. and position sensors, not shown. When correctly positioned a vacuum is imparted to the platen airholes to firmly hold the sheet. The platen then moves rearwardly under the scan of beam 48. When exposure is complete, the airhole vacuum is relaxed and preferably a positive air displacement blows through the holes to slightly lift the sheet. One or more airjets 52 then are applied to give the sheet a forward lifted motion out through an exit passageway 54 by the same airfoil mechanism earlier described. During the sequence, punches 56 and 58 may optionally punch holes in the sheet. The sheet may be delivered by additional jets, not shown, from exit passageway 54 to further treatment mechanisms such as development means.

As can be seen from the foregoing description, airflow timing, sequencing and instantaneous paper positioning should be carefully controlled. It is within the contemplation of the invention that such airflow, direction and position correction may be controlled by a microprocessor. Such microprocessor is capable of selectively activating flow in the airjets and airholes responsive to sheet position and a predetermined sequencing.

It will be obvious to those skilled in the art that many modifications may be made within the scope of the present invention without departing from the spirit thereof, and the invention includes such modifications within the scope of the appended claims.

What is claimed is:

1. A sheet dispenser comprising means including front and rear walls and an elevatable floor adapted to traverse up and down defining a sheet reservoir for holding a stack of sheets the sheets of which are generally parallel to said floor; a lip on said front wall protruding over a portion of the interior of said reservoir; a rippling airjet means positioned adjacent at least one side of said reservoir defining means for directing a jet of air toward the edges of the top sheets of the stack held by said reservoir to ripple such top sheets and entrain air between them, an airjet plate supported above, spaced from, and in a plane generally parallel to the plane of the top of said reservoir, said plate having a sheet stop catch at the rear portion thereof and having at least one rearward and at least one forward directed airjet port open to the underside of said plate; said stop catch being engageable with a sheet from the top of said stack to positively limit the rearward movement of such sheet; said lip and the front portion of said plate forming an exit path for said sheet; a sheet exposure platen capable of receiving a sheet from said exit path and in the form of a generally rectangular support; an exposure beam capable of scanning the top of said platen from a direction perpendicular to the plane of said platen; and an airjet support shelf positioned above and in a plane generally parallel to the plane of said platen and having a plurality of airjets open to the underside of said shelf capable of moving a sheet in orthogonal directions on said platen to a predetermined position on said platen and being capable of delivering said sheet through an exit passageway.

2. The dispenser of claim 1 further comprising means for punching holes in a sheet.

3. A pneumatic dispenser for dispensing sheets individually from the top of a stack, said dispenser comprising means including a front wall and an elevatable floor defining a reservoir for a stack of sheets which means supports such stack with its sheets generally parallel to said floor, a front stop having a rear edge spaced rearwardly from said front wall and engageable with the top surface of the front end portion of the top sheet of said stack to prevent said front end portion of said top sheet from moving beyond said stop by merely moving in a direction generally perpendicular to its top face, and a rear stop spaced rearwardly from the rear edges of the sheets of a stack contained in said reservoir, said rear stop being so positioned as to be engageable with the rear edge of the top sheet of such stack when it is shifted rearwardly from the position it occupied while part of said stack to positively limit the rearward movement of such sheet, said rearward spacing of said rear stop from the rear edges of the sheets of such stack being such that when the top sheet of such stack is shifted rearwardly to the point at which its rear edge engages said rear stop the front edge of such top sheet is positioned rearwardly of said rear edge of said front stop and is therefore disengaged from said front stop and freed for movement away from said stack in the direction perpendicular to its top face, a rippling airjet means positioned adjacent at least one side of said reservoir defining means for directing a jet of air toward the edges of the top sheets of said stack to ripple such top sheets and entrain air between them, a guide plate supported above said reservoir in spaced generally parallel relation to the top sheet of a stack of sheets contained in said reservoir while such sheet is still part of such stack, first airjet means associated with said guide plate for first creating a rearwardly directed current of air between said guide plate and the top sheet of a stack of sheets contained in said reservoir which rearward air current has a velocity greater than and a static pressure lower than the air introduced under said top sheet by said rippling air jet means so that a pressure difference is created across such top sheet lifting it from the remainder of such stack in the direction generally perpendicular to its top face and which rearward air current also creates a rearwardly directed force on such top sheet moving it rearwardly toward said rear stop thereby freeing its front end portion from said front stop, and second air jet means associated with said guide plate for thereafter creating a forwardly directed current of air between said guide plate and such top sheet of such stack which forward air current also has a velocity greater than and a static pressure lower than the air introduced under said top sheet by said rippling air jet means so that a pressure difference is created across such top sheet lifting it from the remainder of said stack and which forward air current also creates a forwardly directed force on such top sheet moving it forwardly from said rear stop and over said forward stop along a dispensing path extending forwardly from said reservoir.

4. A pneumatic dispenser as defined in claim 3 further characterized by said front stop being a lip extending rearwardly from the top edge of said front wall.

5. A pneumatic dispenser as defined in claim 3 further characterized by said rear stop being integral with said guide plate.

6. A pneumatic dispenser as defined in claim 3 further characterized by said first air jet means for creating a rearwardly directed current of air being at least one airjet port open to the underside of said guide plate, and said second air jet means for creating a forwardly directed current of air being at least one other airjet port open to the underside of said guide plate.

7. A pneumatic dispenser for dispensing thin, flexible paper sheets individually from the top of a stack, said dispenser comprising means including a front wall and an elevatable floor defining a reservoir for a stack of such paper sheets, which means supports such stack in an inclined condition with the front end of each sheet lower than its rear end and its sheets generally parallel to said floor, a front stop having a rear edge spaced rearwardly from said front wall and engageable with the top surface of the front end portion of the top sheet of said stack to prevent said front end portion of the top sheet from moving beyond said stop by merely moving in a direction generally perpendicular to its top face, and a rear stop spaced rearwardly from the rear edges of the sheets of a stack contained in said reservoir, said rear stop being so positioned as to be engageable with the rear edge of the top paper sheet of such stack when it is shifted rearwardly from the position it occupied while part of said stack to positively limit the rearward movement of such sheet, said rearward spacing of said rear stop from the rear edges of the sheets of such stack being such that when the top sheet of such stack is shifted rearwardly to the point at which its rear edge engages said rear stop, the front edge of such top paper sheet is positioned rearwardly of said rear edge of said front stop and is therefore disengaged from said front stop and freed for movement away from said stack in the direction perpendicular to its top face, a rippling airjet means positioned adjacent at least one side of said reservoir defining means for directing a jet of air toward the edges of the top paper sheets of said stack to ripple such top sheets and entrain air between them, a guide plate supported above said reservoir in spaced generally parallel relation to the top sheet of a stack of sheets contained in said reservoir while such sheet is still part of such stack, first airjet means associated with said guide plate for first creating a rearwardly directed current of air between said guide plate and the top paper sheet of a stack of sheets contained in said reservoir, which rearward air current has a velocity greater than and a static pressure lower than the air introduced under said top sheet by said rippling air jet means so that a pressure difference is created across such top sheet, lifting it from the remainder of such stack in the direction generally perpendicular to its top face, and which rearward air current also creates a rearwardly directed force on such top sheet, moving it rearwardly toward said rear stop and thereby freeing its front end portion from said front stop, and a second air jet means associated with said guide plate for thereafter creating a forwardly directed current of air between said guide plate and such top sheet of such stack, which forward air current also has a velocity greater than and a static pressure lower than the air introduced under said top sheet by said rippling air jet means so that a pressure difference is created across such top sheet, lifting it from the remainder of said stack, and which forward air current also creates a forwardly directed force on such top sheet, moving it forwardly from said rear stop and over said forward stop along a dispensing path extending forwardly from said reservoir.

* * * * *